(12) United States Patent
Kato

(10) Patent No.: US 8,931,968 B2
(45) Date of Patent: Jan. 13, 2015

(54) PORTABLE DEVICE WITH DISPLAY FUNCTION

(71) Applicant: Pentax Ricoh Imaging Company, Ltd., Tokyo (JP)

(72) Inventor: Tetsuaki Kato, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 182 days.

(21) Appl. No.: 13/666,295

(22) Filed: Nov. 1, 2012

(65) Prior Publication Data

US 2013/0107103 A1    May 2, 2013

(30) Foreign Application Priority Data

Nov. 2, 2011   (JP) .................... 2011-241491

(51) Int. Cl.
| | |
|---|---|
| *H04N 5/222* | (2006.01) |
| *H04N 5/228* | (2006.01) |
| *H04N 5/262* | (2006.01) |
| *G09G 5/00* | (2006.01) |
| *G03B 17/00* | (2006.01) |

(Continued)

(52) U.S. Cl.
CPC .......... *G06F 3/0481* (2013.01); *H04N 5/23293* (2013.01)
USPC ..................... 396/659; 348/208.2; 348/222.1; 348/240.2; 348/333.01; 348/333.12; 345/649; 396/50

(58) Field of Classification Search
USPC ................... 348/208.2, 222.1, 240.99–240.2, 348/333.01–333.12; 345/649–659; 396/50
See application file for complete search history.

(56) References Cited

U.S. PATENT DOCUMENTS

| | | | | |
|---|---|---|---|---|
| 6,137,468 | A | * | 10/2000 | Martinez et al. ............. 345/649 |
| 6,148,149 | A | * | 11/2000 | Kagle ............................ 396/50 |
| 6,812,967 | B1 | * | 11/2004 | Niikawa et al. .......... 348/333.05 |

(Continued)

FOREIGN PATENT DOCUMENTS

| | | |
|---|---|---|
| JP | 2002-341991 | 11/2002 |
| JP | 2004-072207 | 3/2004 |

(Continued)

OTHER PUBLICATIONS

Canon : "EOS 5D Mark II Instruction Manual", XP002719902, URL:http://www.usa.canon.com/nw3s/CanonUSA/DownloadContents/English/0300167601EN.htm, Mar. 16, 2010, pp. 133.

(Continued)

*Primary Examiner* — Michael Osinski
(74) *Attorney, Agent, or Firm* — Greenblum & Bernstein, P.L.C.

(57) ABSTRACT

A portable device has a display, a display processor displays a magnification image on a screen of the display, and an input device. The portable device further has a display-area shift processor that shifts the magnification-image-display area in accordance to an input operation administered to the input device, and a position sensor that detects an angle of inclination of the body. Then, The display processor changes the magnification-image-display area to an image area that is inclined by an angle corresponding to the angle of inclination, and the display-area shift processor changes shift directions of the magnification-image-display area from vertical and lateral directions of the original image to directions that are perpendicular to each other and correspond to inclined vertical and lateral directions rotated by the angle of inclination.

7 Claims, 9 Drawing Sheets

(51) Int. Cl.
*G06F 3/0481* (2013.01)
*H04N 5/232* (2006.01)

(56) References Cited

U.S. PATENT DOCUMENTS

| | | | |
|---|---|---|---|
| 7,471,328 B2* | 12/2008 | Kim et al. | 348/333.12 |
| 7,492,406 B2* | 2/2009 | Park et al. | 348/333.05 |
| 7,532,235 B2* | 5/2009 | Wang | 348/207.99 |
| 7,796,178 B2* | 9/2010 | Hasegawa | 348/333.01 |
| 7,853,140 B2* | 12/2010 | Sugimoto | 396/296 |
| 7,859,516 B2* | 12/2010 | Hanyu | 345/158 |
| 7,898,580 B2* | 3/2011 | Abe et al. | 348/240.2 |
| 8,345,145 B2* | 1/2013 | Hur | 348/345 |
| 8,436,920 B2* | 5/2013 | Abe et al. | 348/240.2 |
| 8,451,296 B2* | 5/2013 | Ono | 345/649 |
| 8,457,486 B2* | 6/2013 | Misawa | 396/374 |
| 8,502,878 B2* | 8/2013 | Shintani et al. | 348/222.1 |
| 8,593,558 B2* | 11/2013 | Gardiner et al. | 348/333.12 |
| 8,615,112 B2* | 12/2013 | Takano et al. | 382/118 |
| 8,711,265 B2* | 4/2014 | Kawamura et al. | 348/333.02 |
| 8,823,857 B2* | 9/2014 | Kazama | 348/333.11 |
| 2001/0007469 A1* | 7/2001 | Fuchimukai et al. | 348/208 |
| 2001/0012072 A1* | 8/2001 | Ueno | 348/333.02 |
| 2003/0052985 A1* | 3/2003 | Oya et al. | 348/333.02 |
| 2003/0063200 A1 | 4/2003 | Isoyama | 348/239 |
| 2003/0071904 A1* | 4/2003 | Karasaki et al. | 348/231.3 |
| 2003/0076437 A1* | 4/2003 | Karasaki et al. | 348/347 |
| 2003/0098847 A1* | 5/2003 | Yamamoto | 345/158 |
| 2003/0160886 A1* | 8/2003 | Misawa et al. | 348/347 |
| 2004/0017506 A1* | 1/2004 | Livingston | 348/374 |
| 2004/0141085 A1* | 7/2004 | Nickel et al. | 348/333.11 |
| 2004/0239792 A1* | 12/2004 | Shibutani et al. | 348/333.12 |
| 2005/0083426 A1* | 4/2005 | Yoo et al. | 348/333.05 |
| 2005/0122401 A1* | 6/2005 | Horie | 348/207.99 |
| 2005/0206736 A1* | 9/2005 | Ng et al. | 348/208.7 |
| 2005/0219393 A1* | 10/2005 | Sugimoto | 348/333.01 |
| 2006/0038908 A1* | 2/2006 | Yoshino | 348/333.11 |
| 2006/0221203 A1 | 10/2006 | Abe et al. | |
| 2007/0291154 A1* | 12/2007 | Moon et al. | 348/333.05 |
| 2008/0024643 A1* | 1/2008 | Kato | 348/333.01 |
| 2008/0273098 A1* | 11/2008 | Ito | 348/240.2 |
| 2009/0002391 A1* | 1/2009 | Williamson et al. | 345/619 |
| 2009/0066730 A1* | 3/2009 | Mikawa | 345/661 |
| 2009/0128484 A1* | 5/2009 | Hanyu | 345/156 |
| 2009/0153649 A1* | 6/2009 | Hirooka et al. | 348/47 |
| 2009/0153721 A1 | 6/2009 | Fujio et al. | |
| 2009/0153722 A1* | 6/2009 | Fujio et al. | 348/333.12 |
| 2009/0268076 A1* | 10/2009 | Kawamura et al. | 348/333.12 |
| 2010/0134641 A1* | 6/2010 | Marti et al. | 348/222.1 |
| 2010/0149377 A1 | 6/2010 | Shintani et al. | |
| 2010/0149402 A1* | 6/2010 | Aoki et al. | 348/333.12 |
| 2010/0214445 A1* | 8/2010 | Chronqvist | 348/231.99 |
| 2010/0225798 A1* | 9/2010 | Lim | 348/333.05 |
| 2010/0253792 A1* | 10/2010 | Kawaguchi et al. | 348/208.2 |
| 2011/0018970 A1* | 1/2011 | Wakabayashi | 348/47 |
| 2011/0090256 A1* | 4/2011 | Manchester | 345/649 |
| 2011/0242394 A1* | 10/2011 | Ohdate | 348/333.02 |
| 2013/0141362 A1* | 6/2013 | Asanuma | 345/173 |

FOREIGN PATENT DOCUMENTS

| | | |
|---|---|---|
| JP | 2005-080086 | 3/2005 |
| JP | 2005-175977 | 6/2005 |
| JP | 2006-128959 | 5/2006 |
| JP | 2010-050897 | 3/2010 |
| JP | 2011-002626 | 1/2011 |
| JP | 2011-175120 | 9/2011 |

OTHER PUBLICATIONS

Search report from E.P.O., mail date is Feb. 18, 2014.

* cited by examiner

<ORIGINAL IMAGE>

PORTABLE DEVICE WITH DISPLAY FUNCTION

BACKGROUND OF THE INVENTION

1. Field of the Invention

The present invention relates to a portable device with a display function, such as a digital camera or a cell phone. In particular, it relates to displaying a magnified image.

2. Description of the Related Art

In a digital camera, a recorded photographic image is displayed on the screen of a display, such as an LCD monitor in a playback mode, and part of a displayed image can be magnified by operating a zoom button, which is disposed on the back surface of the camera. While the magnified image is displayed on the screen, an operator can change the area to be magnified by operating a cross-shaped button composed of an up button, a down button, a left button, and a right button. In accordance to the input operation administered to the cross-shaped button, an area to be magnified is shifted in left-right and/or up-down directions. This scrolling function allows an operator to confirm a part of a photographed image in detail.

The shift direction of the magnified area corresponds to up-down or right-left directions on the screen, in accordance to the input operation administered to the cross-shaped button (for example, see JP2004-72207A). Therefore, when an operator would like to see a different area that is apart from the present magnified area in a diagonal or slanted direction, multiple input operations are required since the shift direction is restricted to the vertical and lateral directions on the screen. It is especially time consuming and troublesome when a magnified image is displayed with a high scaling factor.

SUMMARY OF THE INVENTION

The object of the present invention is to provide a portable device that is capable of shifting a magnified area in a desirable direction smoothly and easily.

A portable device according to the present invention comprises a body that comprises a display, a display processor displays a magnification image on a screen of the display, and an input device. The magnification image is obtained by magnifying a part of an original image. The input device is operated to shift a magnification-image-display area in the original image along up-down directions and/or left-right directions on the screen. The portable device further has a display-area shift processor that shifts the magnification-image-display area in accordance to an input operation administered to the input device; and a position sensor that detects an angle of inclination of the body. Then, The display processor changes the magnification-image-display area to an image area that is inclined by an angle corresponding to the angle of inclination, and the display-area shift processor changes shift directions of the magnification-image-display area from vertical and lateral directions of the original image to directions that are perpendicular to each other and correspond to inclined vertical and lateral directions rotated by the angle of inclination.

The display-area shift processor may change a shift amount of the magnification-image-display area relative to the magnitude of the input operation, in response to the angle of inclination.

The display processor may display a sample guide mark that represents a relative position of the magnification-image-display area in the original image. The display processor may display the sample guide mark along a horizontal direction regardless of the angle of inclination.

The display processor may display indicating marks that indicate the up-down and the right-left directions on the screen regardless of the angle of inclination.

The input device may comprise an up button, down button, left button, and right button.

A method for displaying a magnification image, according to another aspect of the present invention, comprises: a) displaying a magnification image on a screen of a display, the magnification image being obtained by magnifying a part of an original image; b) shifting the magnification-image-display area in accordance to an input operation administered to an input device, the input device being operated to shift a magnification-image-display area in the original image along up-down directions and/or left-right directions on the screen; c) detecting an angle of inclination of a body that comprises the body; d) changing the magnification-image-display area to an image area that is inclined by an angle corresponding to the angle of inclination; and e) changing shift directions of the magnification-image-display area from vertical and lateral directions of the original image to directions that are perpendicular to each other and correspond to inclined vertical and lateral directions rotated by the angle of inclination.

A computer readable memory that comprises a program for displaying a magnification image, according to another aspect of the present invention, comprises: a display processing code that displays a magnification image on a screen of a display, the magnification image being obtained by magnifying a part of an original image; a display-area shift processing code that shifts the magnification-image-display area in accordance to an input operation administered to an input device, the input device being operated to shift a magnification-image-display area in the original image along up-down directions and/or left-right directions on the screen; a display changing code that changes the magnification-image-display area to an image area that is inclined by an angle corresponding to an angle of inclination of a body that comprises the display; and a shift direction changing code that changes shift directions of the magnification-image-display area from vertical and lateral directions of the original image to directions that are perpendicular to each other and correspond to inclined vertical and lateral directions rotated by the angle of inclination.

A portable device according to another aspect of the present invention comprises: a body that comprises a display; a display processor displays a magnification image on a screen of the display, the magnification image obtained by magnifying apart of an original image; an input device, the input device being operated to shift a magnification-image-display area in the original image along up-down directions and/or left-right directions on the screen; a display-area shift processor that shifts the magnification-image-display area in accordance to an input operation administered to an input device; and a position sensor that detects an angle of inclination of the body. The input device is operated to shift a magnification-image-display area in the original image along up-down directions and/or left-right directions on the screen. The display-area shift processor changes shift directions of the magnification-image-display area from vertical and lateral directions of the original image to directions that correspond to a diagonal direction of the original image when the angle of inclination exceeds a tolerance angle.

A method for displaying a magnification image, according another aspect of the present invention, comprises: a) displaying a magnification image on a screen of the display, the magnification image obtained by magnifying a part of an original image; b) shifting the magnification-image-display area in accordance to an input operation administered to an input device, the input device being operated to shift a magnification-image-display area in the original image along up-down directions and/or left-right directions on the screen; c) detecting an angle of inclination of a body that comprises the display; and d) changing shift directions of the magnification-image-display area from vertical and lateral directions of the original image to directions that correspond to a diagonal direction of the original image when the angle of inclination exceeds a tolerance angle.

A computer readable memory that comprises a program for displaying a magnification image, according to another aspect of the present invention, comprises: a display processing code that displays a magnification image on a screen of the display, the magnification image obtained by magnifying a part of an original image; a display-area shifting code that shifts the magnification-image-display area in accordance to an input operation administered to an input device, the input device being operated to shift a magnification-image-display area in the original image along up-down directions and/or left-right directions on the screen, the display-area shifting code changing shift directions of the magnification-image-display area from vertical and lateral directions of the original image to directions that correspond to a diagonal direction of the original image when a detected angle of inclination exceeds a tolerance angle. The detected angle is an angle of inclination of a body that comprises the display.

A method for displaying a magnification image, another aspect of the present invention, comprises: a) displaying a magnification image on a screen of a display, the magnification image being obtained by magnifying a part of an original image; b) shifting the magnification-image-display area in accordance to an input operation administered to an input device, the input device being operated to shift a magnification-image-display area in the original image along up-down directions and/or left-right directions on the screen; and c) changing shift directions of the magnification-image-display area from vertical and lateral directions of the original image to directions that correspond to a diagonal direction of the original image when a predetermined change input device is operated.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
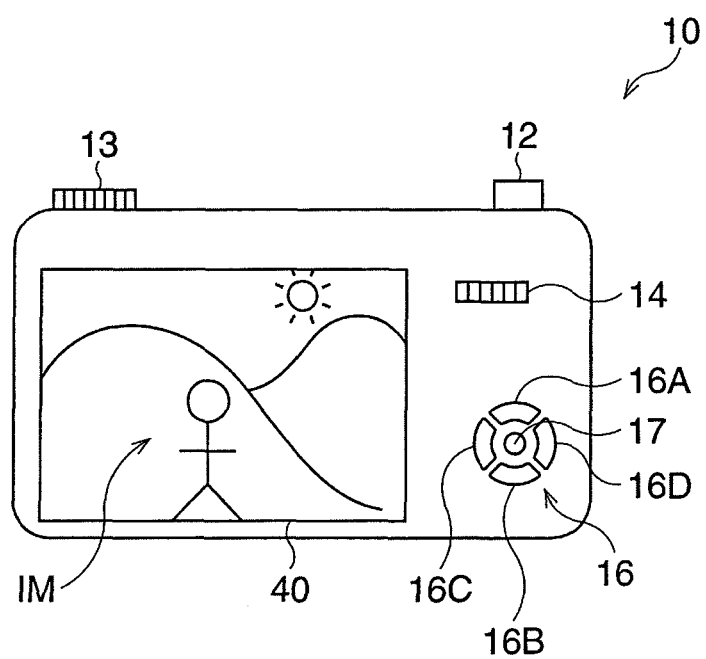
FIG. 1 is a rear view of a digital camera according to the first embodiment.
Figure 2:
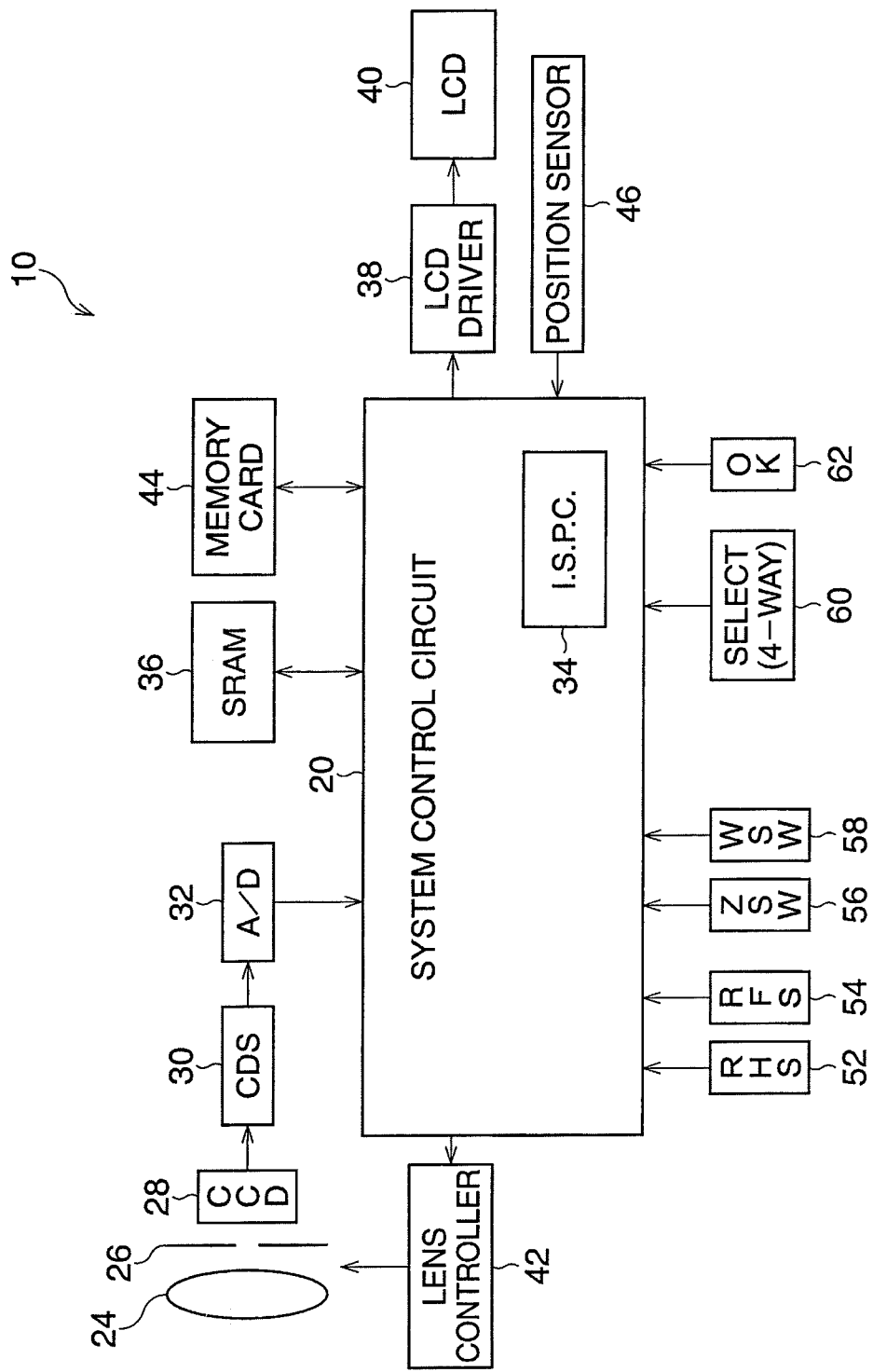
FIG. 2 is a block diagram of the digital camera.
Figure 3:
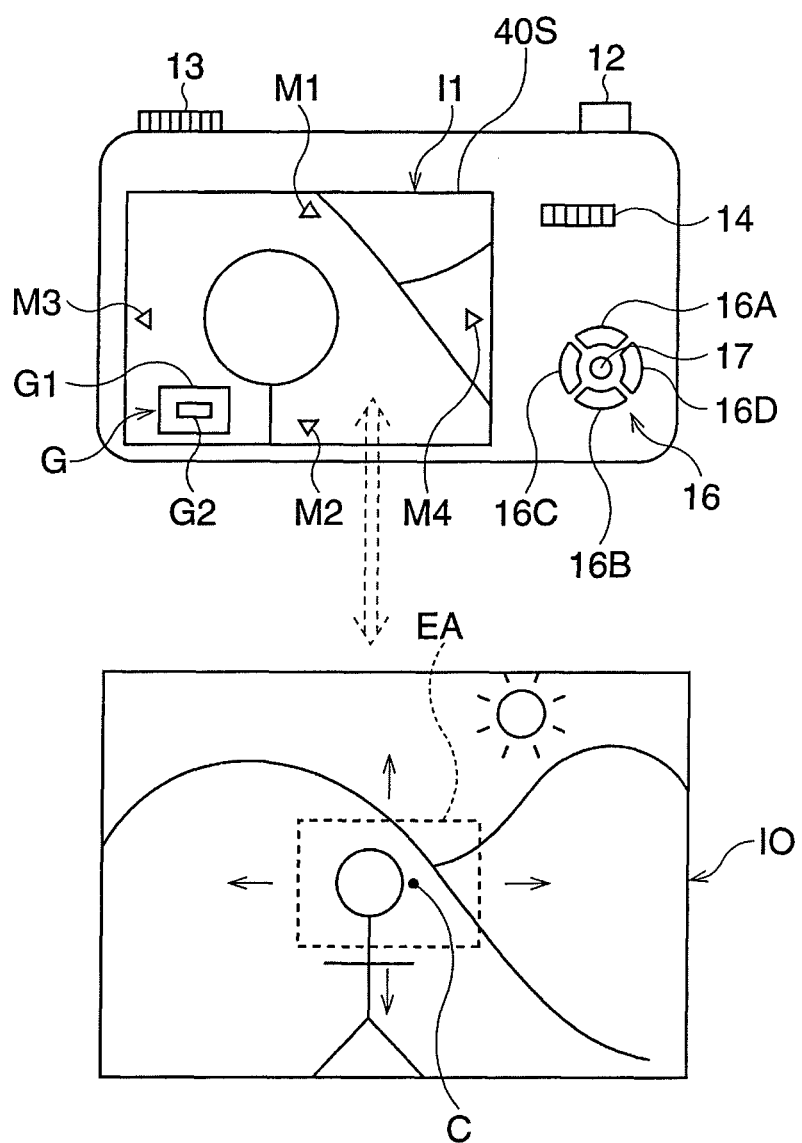
FIG. 3 is a rearview of the digital camera with a magnified image displayed on the display screen.

FIG. 1 is a rear view of a digital camera according to the first embodiment. FIG. 2 is a block diagram of the digital camera. FIG. 3 is a rear view of the digital camera with a magnified image displayed on the display screen.

A compact digital camera 10 is equipped with a photographing optical system on the front surface of the camera 10 and an LCD 40 on the back surface of the camera 10. A mode dial 13 is operated to select a photographing mode, and a release button 12 is operated to carry out a photographing process. Also, a zoom dial 14; a cross-shaped button 16 composed of an up button 16A, a down button 16B, a right button 16C and a left button 16D; and an execute button 17 are provided on the back surface of the camera 10.

A system control circuit 30 shown in FIG. 2, which includes a CPU, a ROM unit, and a RAM unit, controls the action of the body of the camera 10. A program for controlling the camera 10 is stored in the ROM. When the photographing mode is selected, signal processing for displaying a moving image or live image is performed.

In the present embodiment, a one-chip color filter method using one color filter is applied. On the light-receiving area of a CCD 28, a primary color filter checkered by Red (R), Green (G), and Blue (B) color elements is arranged such that each area of the three color elements is opposite a pixel. An object image is formed on the light-receiving surface of the CCD 28 by light passing through a photographing optical system 24 and a shutter 26, so that analog image-pixel signals corresponding to the object image are generated in the CCD 28. The generated image-pixel signals are successively read from the CCD 28 at constant intervals (e.g., $\frac{1}{60}^{th}$-second intervals), and fed to a CDS circuit 30.

The analog image-pixel signals are subjected to a noise reduction process in the CDS circuit 30, and are digitalized on an A/D converter 32. The digital image-pixel signals are subjected to various processes in an image signal processing circuit 34, such as a white-balance adjustment, a color conversion process and a gamma-correction process. Thus, one field's worth of R, G, and B image signals are generated successively. The generated R, G, and B image signals are temporarily stored in an SRAM 36, and are fed to an LCD driver 38. The LCD driver 38 drives the LCD 40 so that a through image is displayed on the LCD 40. Note that the image-pixel signals read from the CCD 28 are subjected to down sampling in accordance to the pixel size of the LCD 40 before the R, G, and B image signals are generated.

When the release button 12 is depressed halfway, the system control circuit 20 detects an operational signal from a half-release switch 52 and carries out a focus adjustment process and an exposure calculation process. A lens controller 42 detects the focus condition of a subject, and the system control circuit 20 outputs a control signal to the lens controller 42 based on a brightness signal from the lens controller 42. A focusing lens in the photographing optical system 24 is shifted so as to bring the subject into focus.

When the release button 12 is fully depressed and a full-push release switch 54 is turned ON, the photographing process to record a still image is carried out. Namely, the shutter 26 opens for a determined period. Thus, one frame's worth of image-pixel signals corresponding to a single still image are read from the CCD 28 and are fed to the system control circuit 20. The one frame's worth of image-pixel signals is subjected to processing in the image-signal processing circuit 34, so that a single digital image is generated and temporarily stored in the SRAM 36. The digital image data is then compressed in accordance with a compression standard such as JPEG, and the compressed image data is recorded in a memory card 44.

When a playback mode is selected with the mode dial 13, a plurality of thumbnail images, namely, a series of recorded images are displayed on the LCD 40. An operator selects one image from the displayed images by pressing the execute button 17 so that corresponding image data is read from the memory card 44 and subjected to an expansion process in the system control circuit 20. The restored image data is fed to the image signal processing circuit 34 so that the recorded image can be displayed on the LCD monitor 40 via the LCD driver 38. Since the resolution or size of the recorded image is larger than that of the LCD 40, the down sampling process is performed on the extended image data.

When the zoom dial 14 is operated by a user during the playback mode, a part of the displayed image is magnified and displayed on the full screen 40S of the LCD 40. The operation of the zoom dial 14 is detected by a zoom switch 56 and a wide switch 58. Thus, as shown in FIG. 3, a partial area EA in the displayed image (original image) IO that has a center point C of the screen 40S as an image-center point is displayed on the full screen 40S as a magnified image (hereinafter, the area EA is called the "magnification-image-display area").

The magnification process applied to the original image IO is carried out by an electronic zoom function. The magnification-image-display area EA has a size that is determined by the scaling factor. Accordingly, the original image data is subjected to a down sampling or interpolation process so as to match with the size of the area EA. The aspect ratio of the area EA is the same as that of the screen 40S. While the magnified image I1 is displayed, pointing marks M1 and M2 that indicate up and down directions on the screen 40S, respectively, and pointing marks M3 and M4 that indicate left and right directions, respectively, are displayed. The pointing marks M1-M4 represent a shift direction of the magnification-image-display area on the screen 40S.

In addition to the pointing marks M1-M4, a guide mark G that indicates a relative position of the area EA in the original image IO is displayed at the left corner of the screen 40S. The guide mark G is composed of a frame mark G1 that is displayed along a horizontal direction and a sample mark G2 that represents the position of the magnification-image-display area EA. The frame mark G1 is an indicator for the original image IO and an operator can recognize the position of the sampled or magnified area in the original image IO by the sample mark G2.

Furthermore, the magnified image I1 can be scrolled while the magnified image I1 is displayed. When the up button 16A or the down button 16B is operated, the magnification-image-display area EA is shifted in the up or down direction in the original image IO. When the left button 16C or the right button 16D is operated, the magnification-image-display area EA is shifted in the left or right direction in the original image IO.

A position sensor 46 shown in FIG. 2 detects an angle of inclination relative to a horizontal position of the camera 10. The system control circuit 20 adjusts the magnification-image-display area EA and its shift direction based on the detected angle of inclination. In this embodiment, when the camera 10 is inclined, the scroll direction in the original image is changed from vertical and lateral directions of the original image IO to inclined directions so as to rotate the vertical and lateral directions by the detected angle. Hereinafter, the change of the scroll direction is explained.

Figure 4:
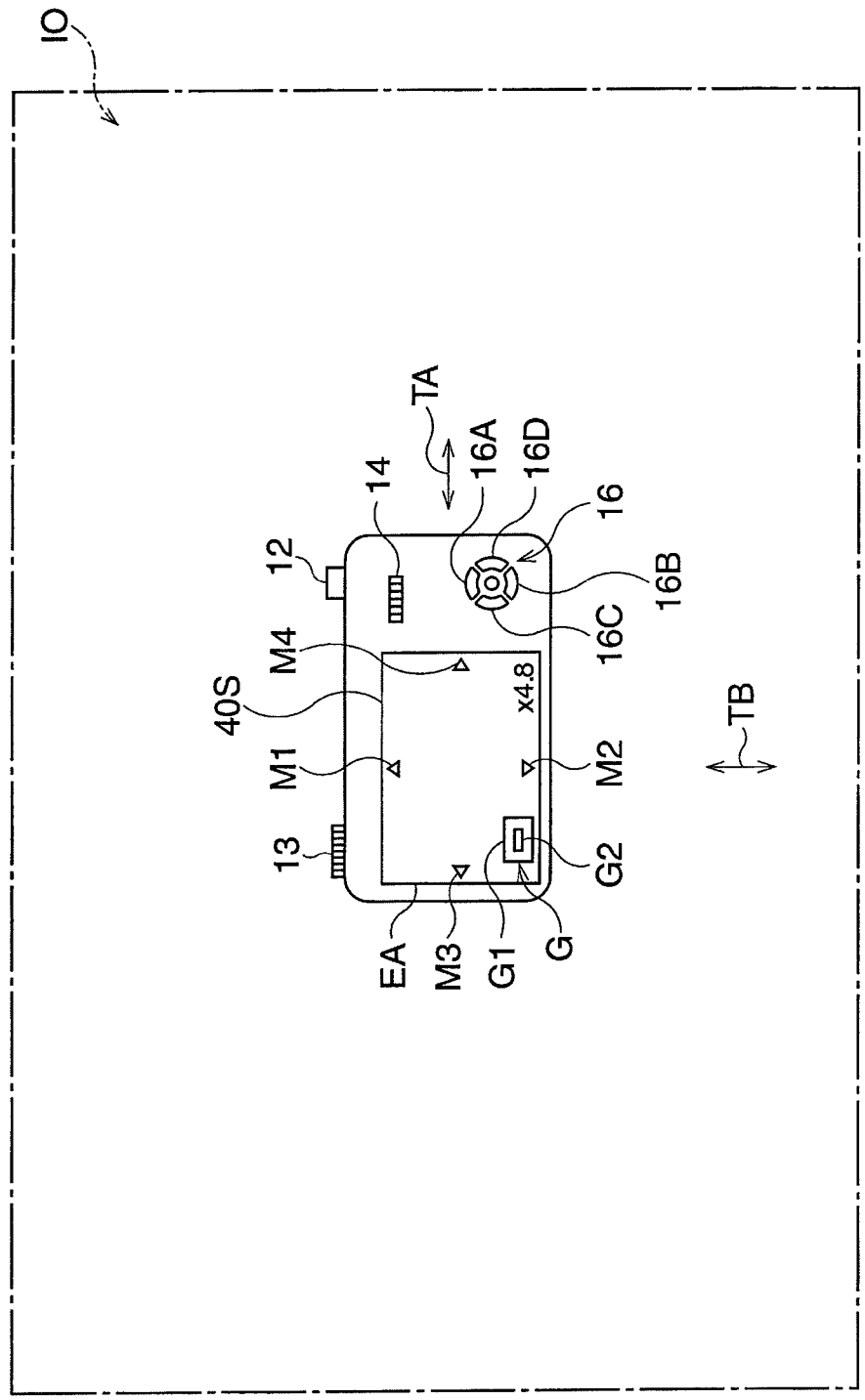
FIG. 4 is a view showing the magnification-image-display area when the camera is held in a horizontal position.
Figure 5:
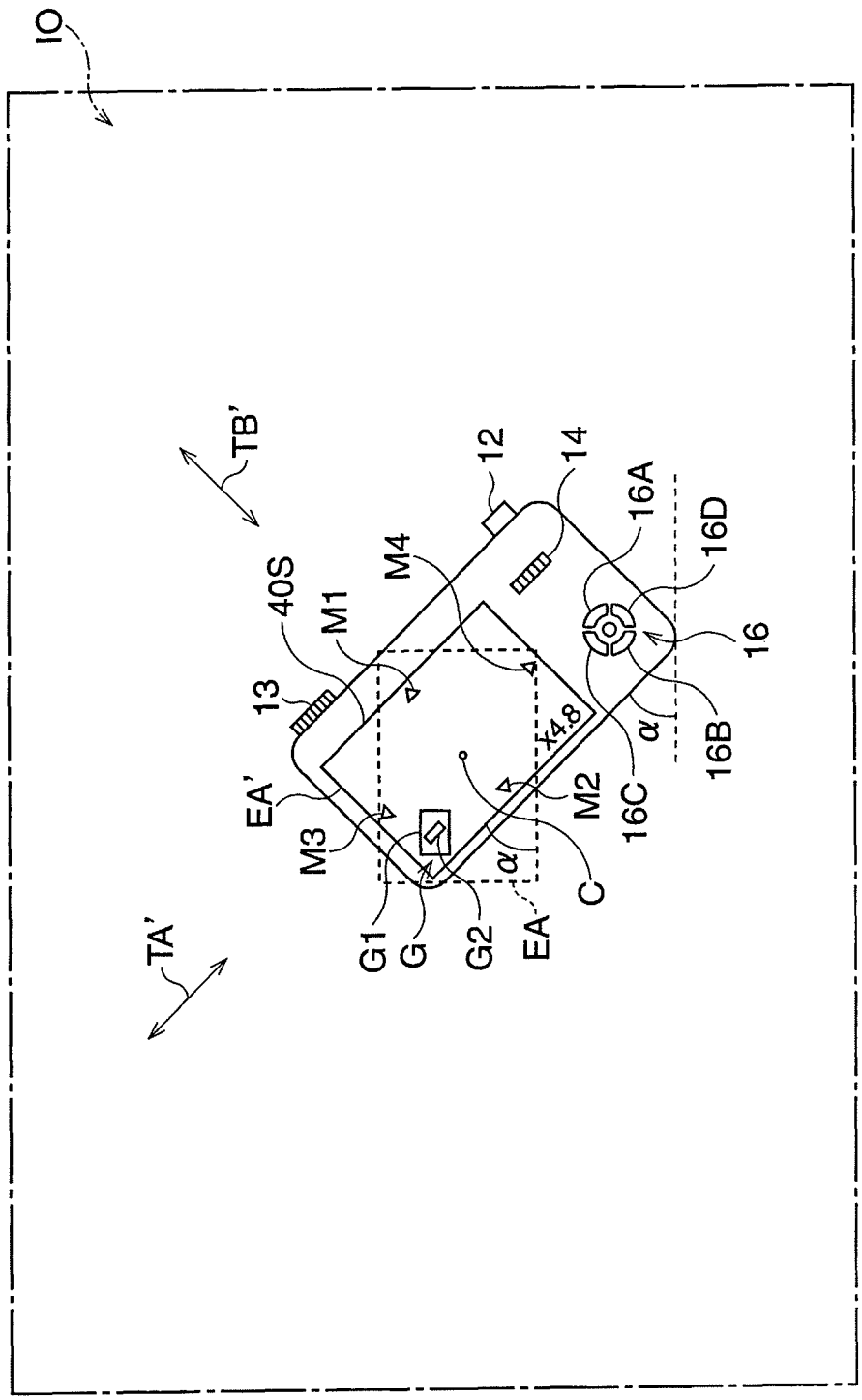
FIG. 5 is a view showing the magnification-image-display area when the camera is inclined from the horizontal direction.

FIG. 4 is a view showing the magnification-image-display area when the camera 10 is held in a horizontal position. FIG. 5 is a view showing the magnification-image-display area when the camera 10 is inclined from the horizontal direction.

In FIGS. 4 and 5, the positions of the magnification-image-display area EA in the original image IO are illustrated. Namely, the portion cut from the original image IO to be the "magnified image," is illustrated. Also, FIGS. 4 and 5 indicate the original image IO with the position of the camera 10.

When the camera 10 is not inclined and held in the horizontal position, the shift directions of the magnification-image-display area are along the lateral direction TA and the vertical direction TB in the original image IO. In this case, the lateral and vertical directions TA and TB coincide with the left-right and up-down directions on the screen 40S and coincide with the indicating directions of the cross-shaped button 16 and the pointing marks M1-M4.

On the other hand, when the camera 10 is inclined at an angle α, the magnification-image-display area is changed to an area EA' that is inclined at the angle of inclination α, as shown in FIG. 5. Herein, the inclined angle α is 45 degrees. This inclined magnification-image-display area EA' is defined by rotating the normal magnification-image-display area EA around the center point C.

Then, the shift direction of the inclined magnification-image-display area EA' is changed from the lateral and vertical directions TA and TB of the original image IO to directions TA' and TB' that are inclined by the angle of inclination α and perpendicular to each other. The directions TA' and TB' coincide with the left-right direction and up-down direction on the screen 40S of the inclined camera 10, and the indicating direction of the pointing marks M1-M4, i.e., the indicating direction of the up, down, left, and right buttons 16A-16D.

Therefore, when an operator operates the cross-shaped button 16 to scroll a magnified image in the up-down and left-right directions along the screen 40S, the magnification-image-display area EA' shifts along the directions TA' and TB'. The shift directions vary with the angle of inclination of the camera 10; the larger the angle of inclination, the larger the angle of the shift directions.

In accordance to the change in the shift directions, the position of the guide mark G is changed. Concretely, the frame mark G1 is displayed with the angle of inclination α so as to be parallel to the horizontal direction, whereas the sample mark G2 is displayed along the left-right directions of the screen 40S.

Figure 6:
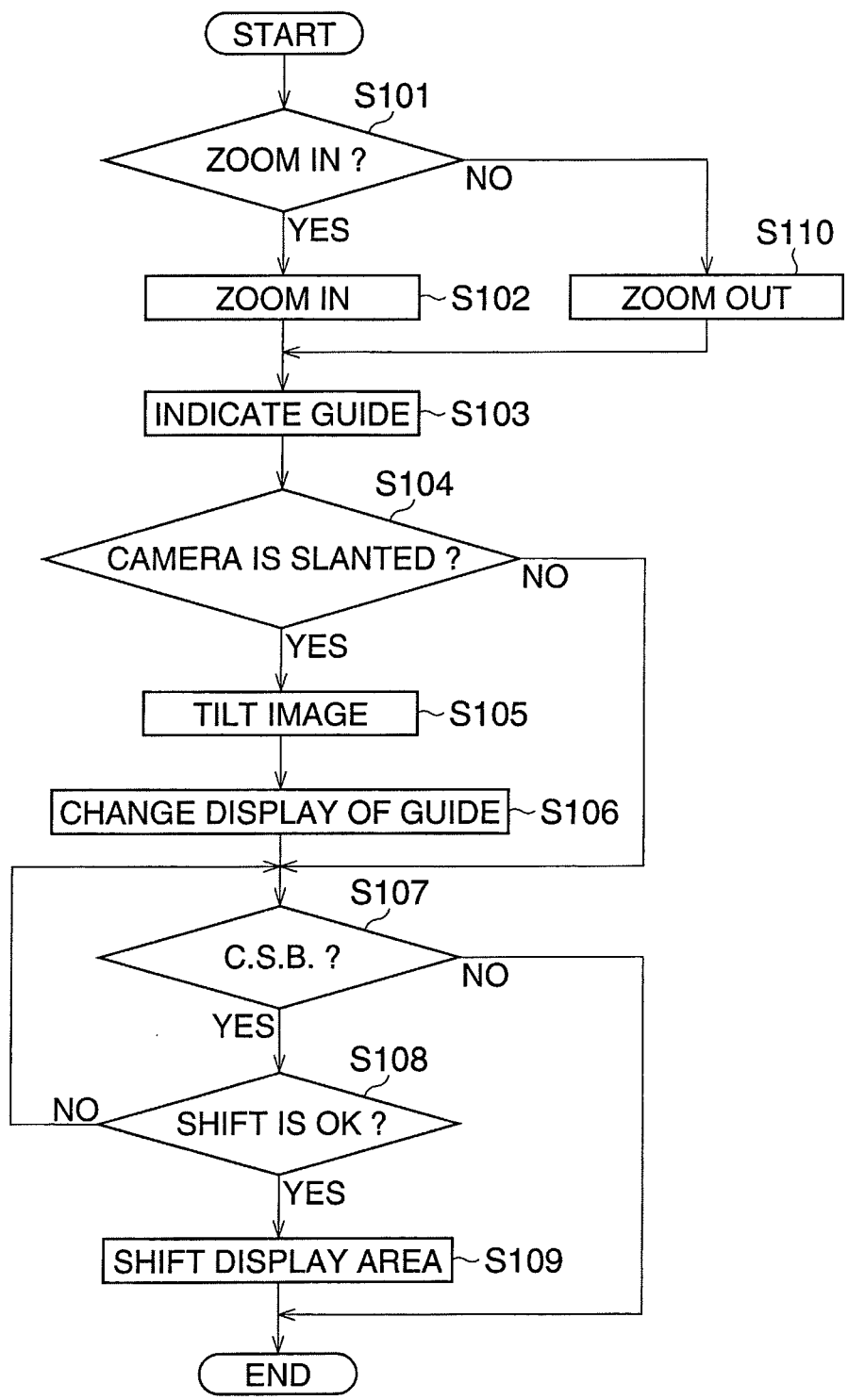
FIG. 6 is a flowchart of the magnification display process.

FIG. 6 is a flowchart of the magnification display process.

When a zoom operation is carried out by an operator while a recorded image is displayed, a magnification-image-display area EA is sampled or cut from the central portion of the original image IO, and a magnified image based on a predetermined scaling factor (>1) is displayed (S101, S102). In the magnification image process, as is well known, a down sampling process is carried out on the original image data based on the screen size of the LCD 40 (the number of screen pixels), the size of the original image (the number of image pixels), the scaling factor, etc. Also, the guide mark G is displayed with the magnified image (S103). On the other hand, when a wide operation is carried out, an image that is zoomed out is displayed (S110).

In Step S104, it is determined whether the camera 10 is inclined from the horizontal position. When it is determined that the camera 10 is inclined, the magnification-image-display area is changed in accordance to a detected angle and part of the original image that corresponds to the position of the changed magnification-image-display area is displayed as a magnified image (S105). Concretely speaking, the original image data is stored in the SRAM 36 and image data in a memory area corresponding to the changed magnification-image-display area is read out to display the image of the memory area. Also, the display position of the guide mark G is changed in accordance to the angle of inclination (S106).

In Step S107, it is determined whether one of the up, down, left or right buttons 16A-16D has been operated. When it is determined that an input operation has been administered to a button, a determination is made as to whether the magnification-image-display area can be shifted (S108). Herein, it is determined whether the edge portion of the magnification-image-display area exceeds the frame of the original image. When it is determined that the magnification-image-display area can be shifted, the magnification-image-display area is shifted in response to the administered input operation so that a new magnified image is displayed (S109).

When an input operation is performed one time, the size of the shift of the changed or inclined magnification-image-display area is increased by an amount corresponding to the angle of inclination, and compared to that in a state where the magnification-image-display area is flat. Concretely, a triangle in which the angle of inclination is the interior angle is defined and a ratio of the hypotenuse to the base is calculated. Then, the size of the shift in a state where the camera 10 is held in the horizontal position is multiplied so that the size of the shift of the inclined magnification-image-display area is obtained.

In this way, the camera 10 according to the first embodiment is capable of changing the shift-direction of the magnification-image-display area EA. When the camera 10 is inclined from the horizontal position by the angle α, the magnification-image-display area EA' that is inclined by the angle α is newly defined. Then, In accordance to the input operation administered to the up button 16A, down button 16B, left button 16C, or right button 16D, the modified magnification-image-display area EA' moves along the changed direction TA' or TB'.

Since the scroll direction is changed to the slanted direction of the original image, the area to be magnified can be smoothly and rapidly moved from one edge portion of the original image to the other edge portion even if the original image has a very large size. Also, the increase in the size of the shift per one input operation allows the shift of the area to be carried out in a relatively short time.

Furthermore, since the shift directions correspond to the up-down and left-right directions on the screen, the operator can operate the cross-shaped button while confirming a direction indicated by the cross-shaped button and/or the pointing marks M1 to M4. Then, since the frame mark G1 is displayed along the horizontal direction and the sample mark G2 is displayed with the inclined angle relative to the frame mark G1, the position of the displayed magnification image in the original image can be clearly viewed by the operator.

It is not necessary for the shift direction of the magnification-image-display area to coincide exactly with the angle of inclination. The shift direction may be roughly set to the angle of inclination. Also, the change of the shift directions may be restricted to a predetermined range of inclination angles (e.g., 20-60 degrees).

An input device other than the cross-shaped button may be optionally applied to the camera. For example, a touch panel can be utilized. Also, an image other than a photographic image can be display and a part of the image can be magnified.

The display of the guide mark G and indicating marks may be changed in response to an input operation regarding a predetermined input device.

Next, the second embodiment is explained with reference to FIGS. 7 and 8. The second embodiment is different from the first embodiment in that shift directions on the screen are modified. All other constructions are substantially the same as those of the first embodiment.

Figure 7:
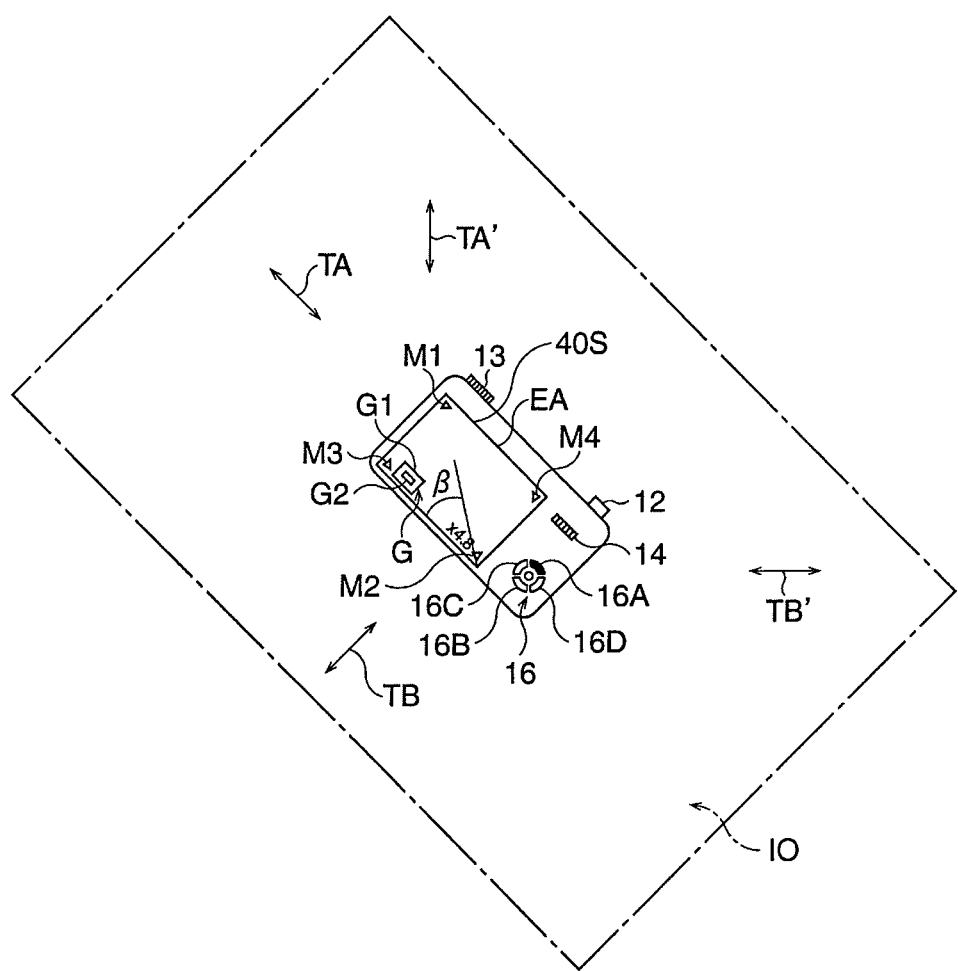
FIG. 7 is a view showing a display of a magnified image according to the second embodiment.

FIG. 7 is a view showing a display of a magnified image according to the second embodiment.

In the second embodiment, the magnification-image-display area is not change even though the camera is inclined. Instead, the shift directions of the magnification-image-display area are changed from the up-down and the left-right directions on the screen 40S to directions along diagonal lines on the screen 40S. Accordingly, the pointing marks M1 to M4 are displayed at the four corners of the screen 40S.

In this case, the directions indicated by the up, down, left, and right buttons 16A to 16D do not correspond to the scroll direction of the magnified image. To recognize a relationship between the buttons and the marks, the up button 16A is herein given a color different from the colors of the other buttons 16B to 16D, and the mark M1 is displayed with the same color.

Consequently, the magnification-image-display area EA moves along the diagonal direction on the screen in accordance to the input operation administered to the cross-shaped button 16. Herein, when the camera 10 is inclined by an angle within a range that matches the diagonal line of the screen 40S, the shift directions are changed to the diagonal directions. The range of the angle includes an angle β of the diagonal.

Figure 8:
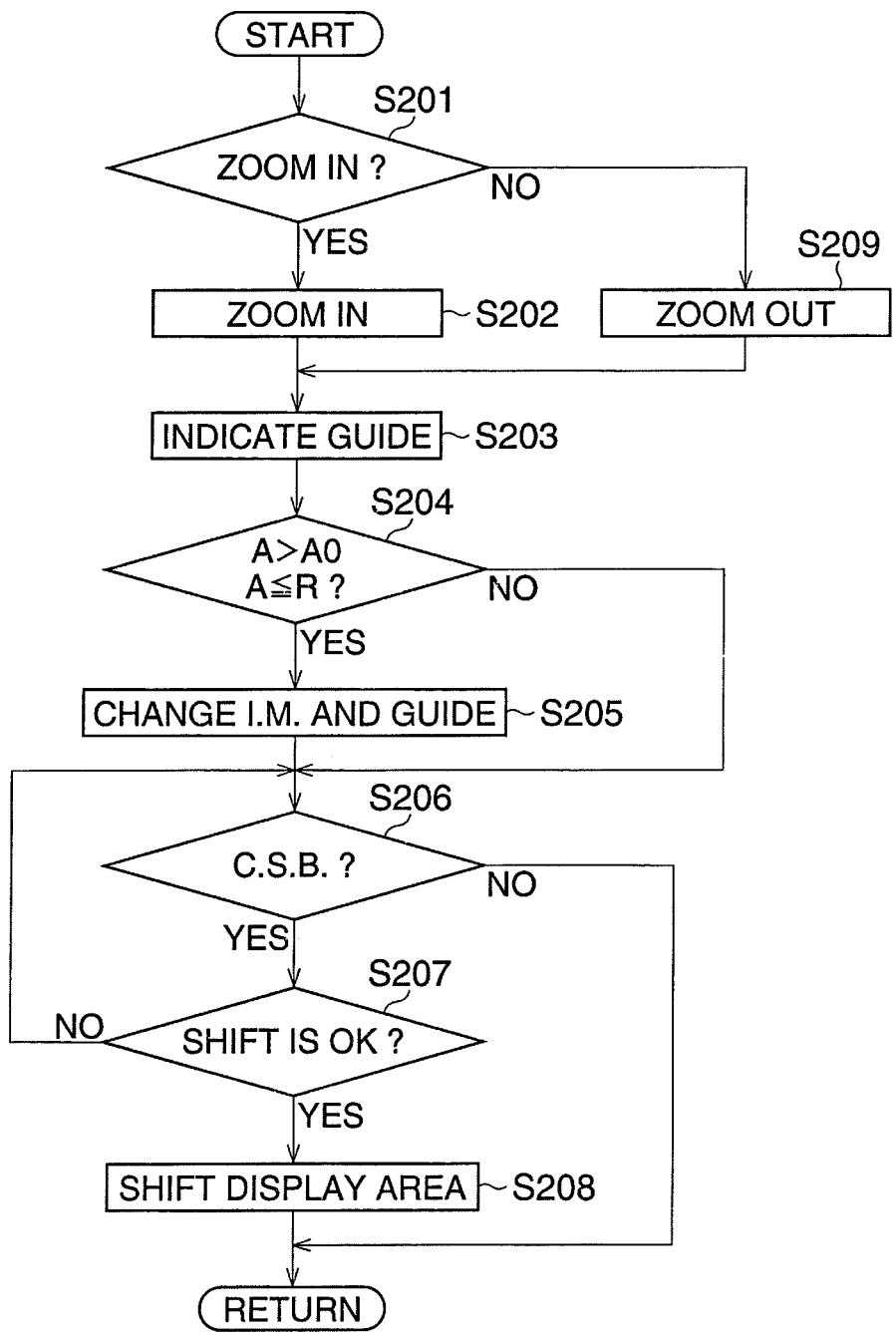
FIG. 8 is a flowchart of a magnification display process according to the second embodiment.

FIG. 8 is a flowchart of a magnification display process according to the second embodiment.

The performances of Step S201 to S203 are the same as that of Step S101 to S103 shown in FIG. 6. In Step S204, it is determined whether the angle of inclination "A" exceeds a tolerance angle "A0" and is within a range "R". Herein, considering the diagonal angle β, the tolerance angle "A0" is set to 20 degrees and the range "R" is between 30 and 50 degrees. On the other hand, when it is determined that the detected angle does not tolerance angle "A0" or the angle is out of the range "R", the shift directions are not changed.

When it is determined that the angle of inclination "A" is within the range "R", the display of the indicating marks M1 to M4 and the guide mark G are changed. Steps S207 to S209 are the same as those of Step S107 to S109 shown in FIG. 6. Note that the shift directions are set to the diagonal angle.

In this way, when the camera 10 is inclined by the angle within the predetermined range, the shift directions of the magnification-image-display area is changed to diagonal directions of the screen, i.e., the original image. Accordingly, the indicating marks M1 to M4 are displayed at the four corners of the screen.

Note that the shift direction may be changed in accordance to an angle of inclination, similarly to the first embodiment. In this case, it may be determined whether the display of the guide mark and indicating marks should be changed because of the inclination of the camera. For example, when the detected angle exceeds the tolerance angle and is less than the minimum of the range, the shift-directions may be changed in accordance with the angle.

Next, the third embodiment is explained with reference to FIG. 9. The third embodiment is different from the second embodiment in that the shift direction of the magnification-image-display area is changed while maintaining the horizontal position of the camera. The other constructions are substantially the same as those of the second embodiment.

Figure 9:
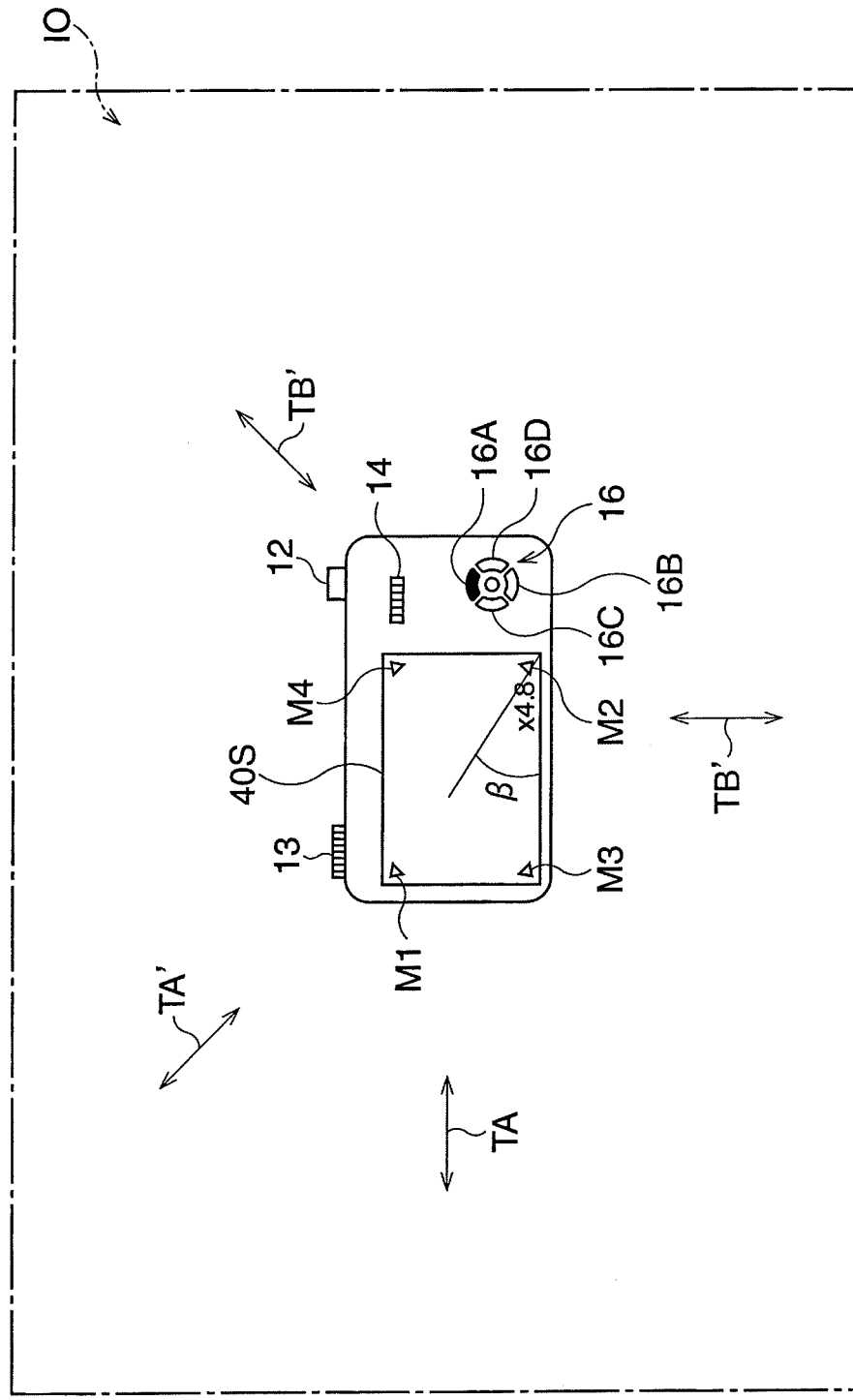
FIG. 9 is a magnification display according to the third embodiment.

FIG. 9 is a magnification display according to the third embodiment.

In the third embodiment, when a given input operation (herein, an operation administered to the mode dial 13) is carried out, the shift directions of the magnification-image-display area is changed from the up-down and left-right directions to diagonal directions TA and TB that are inclined by the angle β. Then, the indicating marks M1 to M4 are displayed at the four corners of the screen.

Consequently, similarly to the second embodiment, the shift directions of the magnification-image-display area are changed to directions corresponding to the angle β of the diagonal line. Note that the shift directions may be optionally predetermined to an angle other than the angle β of the diagonal line.

Any portable electronic equipment with a photographing function, such as a cellular phone, may be implemented instead of a camera.

Finally, it will be understood by those skilled in the arts that the foregoing descriptions are of preferred embodiments of the device, and that various changes and modifications may be made to the present invention without departing from the spirit and scope thereof.

The present disclosure relates to subject matter contained in Japanese Patent Application No. 2011-241491 (filed on Nov. 2, 2011), which is expressly incorporated herein by reference, in its entirety.

The invention claimed is:

1. A portable device comprising:
    a body that comprises a display;
    a display processor displays a magnification image on a screen of said display, the magnification image being obtained by magnifying a part of an original image;
    an input device, said input device being operated to shift a magnification-image-display area in the original image along up-down directions and left-right directions on the screen;
    a display-area shift processor that shifts the magnification-image-display area in accordance to an input operation administered to said input device; and
    a position sensor that detects an angle of inclination of said body, said display processor changing the magnification-image-display area to an image area that is inclined by an angle corresponding to the angle of inclination, said display-area shift processor changing shift directions of the magnification-image-display area from vertical and lateral directions of the original image to directions that are perpendicular to each other and correspond to inclined vertical and lateral directions rotated by the angle of inclination.

2. The apparatus of claim 1, wherein said display-area shift processor changes a shift amount of the magnification-image-display area relative to the magnitude of the input operation, in response to the angle of inclination.

3. The apparatus of claim 1, wherein said display processor displays a sample guide mark that represents a relative position of the magnification-image-display area in the original image, said display processor displaying the sample guide mark along a horizontal direction regardless of the angle of inclination.

4. The apparatus of claim 1, wherein said display processor displays indicating marks that indicate the up-down and the right-left directions on the screen regardless of the angle of inclination.

5. The apparatus of claim 4, wherein said input device comprises an up button, down button, left button, and right button.

6. A method for displaying a magnification image, comprising:
    displaying a magnification image on a screen of a display, the magnification image being obtained by magnifying a part of an original image;
    shifting the magnification-image-display area in accordance to an input operation administered to an input device, said input device being operated to shift a magnification-image-display area in the original image along up-down directions and/or left-right directions on the screen;
    detecting an angle of inclination of a body that comprises said body;
    changing the magnification-image-display area to an image area that is inclined by an angle corresponding to the angle of inclination; and
    changing shift directions of the magnification-image-display area from vertical and lateral directions of the original image to directions that are perpendicular to each other and correspond to inclined vertical and lateral directions rotated by the angle of inclination.

7. A computer readable memory that comprises a program for causing a computer to display a magnification image, said program comprising:
    a display processing code that displays a magnification image on a screen of a display, the magnification image being obtained by magnifying a part of an original image;
    a display-area shift processing code that shifts the magnification-image-display area in accordance to an input operation administered to an input device, said input device being operated to shift a magnification-image-display area in the original image along up-down directions and/or left-right directions on the screen;
    a display changing code that changes the magnification-image-display area to an image area that is inclined by an angle corresponding to an angle of inclination of a body that comprises said display; and
    a shift direction changing code that changes shift directions of the magnification-image-display area from vertical and lateral directions of the original image to directions that are perpendicular to each other and correspond to inclined vertical and lateral directions rotated by the angle of inclination.

* * * * *